(12) United States Patent
Warhover et al.

(10) Patent No.: US 10,664,815 B2
(45) Date of Patent: May 26, 2020

(54) SECURE CUSTOMER RELATIONSHIP MARKETING SYSTEM AND METHOD

(75) Inventors: Tina Louise Warhover, St. Louis, MO (US); Joseph Paul Cilella, Holland, MI (US); Patricia Corliss Brynjolfsson, Tampa, FL (US); Gail VanNoller, Lowell, MI (US); Elmer Robinson, Jr., Marne, MI (US)

(73) Assignee: CATALINA MARKETING CORPORATION, St. Petersburg, FL (US)

( * ) Notice: Subject to any disclaimer, the term of this patent is extended or adjusted under 35 U.S.C. 154(b) by 1449 days.

(21) Appl. No.: 12/204,480

(22) Filed: Sep. 4, 2008

(65) Prior Publication Data

US 2009/0076923 A1    Mar. 19, 2009

Related U.S. Application Data

(60) Provisional application No. 60/972,940, filed on Sep. 17, 2007.

(51) Int. Cl.
*G06Q 30/02* (2012.01)
*G06Q 20/20* (2012.01)

(52) U.S. Cl.
CPC .......... *G06Q 20/202* (2013.01); *G06Q 30/02* (2013.01)

(58) Field of Classification Search
CPC ......... G06F 21/6254; G06F 17/30109; G06F 17/30112; G06F 17/30861; G06F 17/30864; G06F 17/30876; G06F 17/30879; G06Q 30/02; G06Q 20/20; G06Q 30/0226; G06Q 30/0268; G06Q 20/40; G06Q 30/0207; G06Q 30/0224; G06Q 30/0236; G06Q 30/0229; G06Q 30/0239; G06Q 20/363; G06Q 20/383; G06Q 30/0232; G06Q 40/00; G06Q 20/206; G06Q 20/382; G06Q 30/0201; G06Q 30/0204; G06Q 30/0238
See application file for complete search history.

(56) References Cited

U.S. PATENT DOCUMENTS

| | | | |
|---|---|---|---|
| 4,302,810 A * | 11/1981 | Bouricius | G06Q 20/04 380/37 |
| 5,621,812 A * | 4/1997 | Deaton | G06Q 20/387 382/100 |
| 5,642,485 A * | 6/1997 | Deaton | G06Q 20/387 705/14.25 |

(Continued)

FOREIGN PATENT DOCUMENTS

| | | |
|---|---|---|
| JP | 11-250165 | 9/1999 |
| JP | 2002-312361 | 10/2002 |

(Continued)

OTHER PUBLICATIONS

Sep. 25, 2006, PCT Written Opinion PCT/US06/14482.

(Continued)

*Primary Examiner* — Florian M Zeender
*Assistant Examiner* — Dana Amsdell
(74) *Attorney, Agent, or Firm* — McDermott, Will & Emery LLP

(57) ABSTRACT

Network systems and methods are disclosed for maintaining purchase history databases useful for targeted marketing while preventing users from obtaining access to customer financial accounts.

44 Claims, 6 Drawing Sheets

(56) References Cited

U.S. PATENT DOCUMENTS

| | | | |
|---|---|---|---|
| 5,930,764 A * | 7/1999 | Melchione | G06Q 30/02 705/7.29 |
| 6,014,634 A * | 1/2000 | Scroggie | G06Q 20/12 705/14.25 |
| 6,202,923 B1 | 3/2001 | Boyer et al. | |
| 6,208,973 B1 | 3/2001 | Boyer et al. | |
| 6,240,394 B1 | 5/2001 | Uecker et al. | |
| 6,424,949 B1 * | 7/2002 | Deaton | G06Q 20/387 705/14.25 |
| 6,732,113 B1 | 5/2004 | Ober et al. | |
| 6,766,327 B2 * | 7/2004 | Morgan, Jr. | G06F 17/30882 |
| 6,836,843 B2 | 12/2004 | Seroussi et al. | |
| 6,954,732 B1 * | 10/2005 | DeLapa | G06Q 20/387 235/375 |
| 7,024,374 B1 * | 4/2006 | Day | G06Q 30/02 705/14.25 |
| 7,127,432 B2 | 10/2006 | Rubin et al. | |
| 7,233,913 B2 * | 6/2007 | Scroggie | G06Q 20/12 705/14.35 |
| 7,309,001 B2 | 12/2007 | Banfield et al. | |
| 7,593,862 B2 * | 9/2009 | Mankoff | 705/14.1 |
| 2002/0016923 A1 | 2/2002 | Knaus et al. | |
| 2002/0073138 A1 * | 6/2002 | Gilbert et al. | 709/201 |
| 2002/0091650 A1 * | 7/2002 | Ellis | G06Q 20/383 705/74 |
| 2002/0111833 A1 | 8/2002 | Dick | |
| 2003/0009393 A1 * | 1/2003 | Norris | G06Q 20/20 705/14.27 |
| 2003/0220927 A1 | 11/2003 | Iverson et al. | |
| 2003/0229519 A1 | 12/2003 | Eidex et al. | |
| 2003/0236712 A1 * | 12/2003 | Antonucci et al. | 705/26 |
| 2004/0143171 A1 | 7/2004 | Kalies | |
| 2004/0143594 A1 | 7/2004 | Kalies | |
| 2004/0148195 A1 | 7/2004 | Kalies | |
| 2004/0215981 A1 | 10/2004 | Ricciardi et al. | |
| 2004/0256453 A1 | 12/2004 | Lammle | |
| 2005/0065821 A1 | 3/2005 | Kalies | |
| 2005/0102181 A1 * | 5/2005 | Scroggie | G06Q 20/12 705/14.35 |
| 2005/0144066 A1 * | 6/2005 | Cope | G06Q 30/02 705/14.25 |
| 2005/0165784 A1 * | 7/2005 | Gomez | G06F 16/152 |
| 2005/0171898 A1 * | 8/2005 | Bishop | G07F 7/1083 705/39 |
| 2005/0192008 A1 * | 9/2005 | Desai | G06F 21/335 455/435.2 |
| 2005/0246181 A1 * | 11/2005 | Kawahara | G06Q 20/04 705/35 |
| 2007/0083449 A1 * | 4/2007 | Roberts | 705/35 |
| 2008/0172337 A1 | 7/2008 | Banfield et al. | |
| 2008/0185425 A1 | 8/2008 | Roberts et al. | |
| 2008/0221982 A1 * | 9/2008 | Harkins | G06Q 30/02 705/14.48 |
| 2008/0283592 A1 * | 11/2008 | Oder, II ("J.D.") | G06Q 20/20 235/380 |
| 2009/0043707 A1 | 2/2009 | Roberts et al. | |
| 2009/0076923 A1 | 3/2009 | Warhover et al. | |
| 2010/0131369 A1 * | 5/2010 | Dominguez | G06Q 30/02 705/14.67 |
| 2014/0244373 A1 * | 8/2014 | Laiderman | G06Q 30/0225 705/14.26 |

FOREIGN PATENT DOCUMENTS

| | | | |
|---|---|---|---|
| JP | 2003-141252 | | 5/2003 |
| JP | 2004078925 A | * | 3/2004 |
| JP | 2004-157978 | | 6/2004 |
| KR | 2002084624 A | * | 11/2002 |
| WO | WO 03/017166 | | 2/2003 |

OTHER PUBLICATIONS

Sep. 25, 2006, International Search Report PCT/US06/14482.
Jan. 16, 2007, PCT Written Opinion PCT/US06/19432.
Jan. 16, 2007, International Search Report PCT/US06/19432.
Examiner's Report for associated Canadian application 2,609,009, dated Mar. 11, 2010.
Jan. 2001, "De-identified Health Information," Jan. 2001, http://irb.ucsd.edu/HIPAA_deidentification_factsheet.pdf.
Extended European Search Report dated Sep. 14, 2010 in associated application EP06750509.9.
English translation of office action of JPO for patent application No. 2008-514683, dated Jan. 4, 2011.
English translation of office action of JPO for patent application No. 2008-514634, dated May 31, 2011.

* cited by examiner

SECURE CUSTOMER RELATIONSHIP MARKETING SYSTEM AND METHOD

CROSS REFERENCE TO RELATED APPLICATIONS

This application claims priority to provisional application No. 60/972,940, control number, 8796, filed Sep. 17, 2007, titled "Customer Relationship Marketing."

FIELD OF THE INVENTION

This invention relates to tracking relationships while complying with privacy concerns

Definitions

The following definitions and examples apply to terms used herein.

Network system—An system of computers that can communicate via network communication protocols using packets of data. Each computer in the system has a network address which address can be used by another computer to address information to the addressed computer.

POS—The location where a business transaction occurs.

Money—Anything accepted for payment, such as cash or credit.

Purchase transaction—A transaction in which at least one product or service is exchanged for money.

Retail store—A store in which items of products are sold to consumers.

POS terminal—A device for entering or reading identification of products and amounts of money paid for those products in a purchase transaction. A POS terminal may and preferable does include its own central processing unit and computer operating system.

POS computer system—A computer system including a plurality of POS terminals and a POS main computer in which the terminals and the main computer are networked.

POS main computer—A POS computer logging data for purchase transactions from plural POS terminals, and also storing and updating in memory records for product price and inventory for a retail store.

Financial account identifier, also referred to here in as a Tender Identification.—An identifier associated with a financial account, such as a credit card account, debt card account, or bank account.

Data defining the customer's product purchases—At least product identifiers such as the modern day version of Universal Product Codes (UPCs), but preferably also including quantity of items of each product purchased, price of each item, coupon identifications for redeemed coupons, and optionally other data.

Encrypted—Encryption is the process of transforming information (referred to as plain text) using an algorithm to make it unreadable to anyone except those possessing special knowledge, usually referred to as a key. The result of the process is encrypted information. For example, text stored in a computer system in ASCII code may be encrypted to still be defined by ASCII code, but in which one ASCII character is replaced by another in the encryption process. Alternatively, information originally stored digitally in a format resulting in ASCII text when viewed using a certain computer program may be encrypted by running an algorithm on the digital data, as opposed to on the ASCII characters.

Data identifying a transaction—Any data capable of uniquely defining a transaction, such as a transaction ID generated by a POS, a POS ID, retail store ID, and time of transaction, a combination of an encrypted financial account identifier and time, a combination of an encrypted financial account identifier and a POS ID, a combination of a POS network address and time, etc. POS ID refers to an identifier unique in a retail store to a POS.

Payload refers to marketing information to be presented at a POS during a transaction in which an HHID associated with the Payload is received at that POS.

Additional memory herein refers to memory in addition to memory storing operating code and utility code.

UPC—Any product identifier code for a product.

Acronyms

The following acronyms are used herein.

POS—Point of Sale.

TID—Tender Identification (also referred to as a financial account identifier).

FSID—Frequent Shopper Identification.

UPC—Universal Product Code; now used to refer to any product identifier, not just the original 9 digit specification of product identifiers for identifying a product.

ID—Identification.

EncTID—Encrypted TID.

SUMMARY OF THE INVENTION

It is an object of the invention to provide systems and methods for associating plural transactions occurring over time with the same people or family involved in those transactions, for large numbers of people or families, while complying with privacy concerns.

It is an object of the invention to provide systems and methods enabling targeting of incentives to people or family based upon prior transaction data associated with the same person or family, while precluding use of financial account numbers in the targeting.

These and other objects are provided by a network system including a plurality of POS computer systems, one for each one of a plurality of geographically separate retail stores, and a central computer system. Each POS computer system includes at least one POS terminal and a POS main computer system. During a customer's transaction at a POS terminal in one retail store, the customer's financial account identifiers, along with data defining the customer's product purchases, are read at a POS terminal. At that POS terminal, the financial account identifiers are encrypted forming encrypted financial account identifiers and then the encrypted financial account identifiers are transmitted via network communications to the central computer system. The central computer system determines an existing household identifier associated with the financial account identifier (or encrypted financial account identifier), if one exists, or generates one if none exists. The central computer system transmits back to the POS terminal the corresponding household identifier, and preferably also an identifier of the transaction such as the encrypted financial account identifier. The POS terminal associates the received household identifier with the data defining the customer's product purchases and preferably also with a de-identified version of the financial account identifier or identifiers. The POS terminal does not transmit the financial account identifier anywhere, other than for the transmission of an encrypted version thereof to the central computer system. The POS terminal does transmit to another network address, a record for the transaction including the data defining the customer's product purchases (product identifiers, price, quantity) and optionally coupon redemptions and demographic data, in association with the HHID and preferably a de-identified version of the customer's financial account identifier to another network address, for storage and subsequent retrieval. Typically, the network address to which the POS terminal transmits the record association with the HHID is the network address of the POS main computer system, which stores a plurality of transaction records forming a transaction database that is useful for marketing.

Upon receiving the HHID at the POS, the POS terminal sends an HHID payload query, for payloads associated with that HHID. The query is sent to a marketing execution computer that performs marketing execution functions for the retail store. The marketing execution computer may be the POS main computer system for the retail store or a computer. The marketing computer controls access to table or database in which HHID are associated payloads. Any such payloads contain data defining communications, such as a coupon or an advertisement for a product. At least some of the communications are targeted to the customer based upon data defining the customer's product purchases from previous purchases, as indicated by data defining the product purchases associated with the same HHID. The marketing computer transmits any such payloads to the POS during the transaction so that the targeted communications contained there in may be presented to the customer. Presentation to the customer at the POS may be via electronic visual display on a display monitor, via printing on paper, or via wireless transmission to a customer's receiver, such as a cellular telephone number or Internet Protocol address for a cell phone, personal digital assistant, computer or similar portable device.

Alternatively, payload presentation to the customer may occur at locations other than the POS and at times other than while the customer is engaged at the POS in transactions. For example, the payloads may be presented to the customer via email, telephone, postal mail, PC based social networks include blogs, real simple syndication (RSS) feeds; and fuel station terminals (whether or not those terminals are POSs). In some cases, these alternative presentations require address or association information about a consumer that is also associable with their HHID. Such data may be captured and stored by the operator of the POS main computer system through other channels, not relevant here.

Payloads are associated with HHIDs based upon results of targeting software queries. Targeting software queries run against records in a transactions records database. Targeting software queries determine transaction records associated with the HHID that meet targeting criteria. When an HHID meets targeting criteria of a certain targeting query, code stores in association with that HHID a payload associated with that certain targeting query. The payload may for example be a coupon or a marketing communication. The payload may be statically stored data, or it may be generated as a function additional data, such as data defining the customer's product purchases. Generally, the queries and resulting coupon or marketing communications are designed to influence customer behavior in some advantageous manner to provide value to the customer and entity operating the system.

The targeting software queries may be run periodically, from time to time, or in response to receipt of an HHID from a POS indicating that a customer associated with the HHID is at that POS. If the targeting query runs in response to receipt of an HHID transmitted from a POS, the targeting query is designed to be run automatically in response to receipt of the HHID to determine any corresponding payload so that such a payload may be transmitted to the customer during the customer's current tenure at the POS.

The targeting software queries may be run on, and the transactions records database stored in memory controlled by, a marketing analysis computer. However, the marketing analysis computer may be the central computer system, the POS main computer system, or the aforementioned marketing execution computer.

In a preferred embodiment, the POS main computer system performs the functions of the marketing analysis computer and the marketing execution computer. In this embodiment, the only computer system which stores financial account identifiers, other than their transient storage at a POS, is the central computer system, and permissions to access, view, and run queries on that data structures controlled by the central computer system is strictly limited in order to comply with industry requirements on the protection of such data.

In one aspect, the invention provides a network computer system, a method of making the system, and a method of using the system for associating plural transactions in a retail store occurring over time with the same person or family of people involved in those transactions, said computer network system including a POS computer system for said retail store including plural POS terminals in said retail store and a POS computer, a central computer system, and network communications structure enabling communication there between, said method comprising:

inputting, into at least one input device of a POS terminal of said plural POS terminals, a customer's TID and UPCs for said customer's purchase transaction;

storing, in memory of said POS terminal, said UPCs;

generating, using code stored in memory of said POS terminal, an encrypted TID, EncTID, from said TID;

transmitting, from said POS terminal to said central computer system, said EncTID;

storing, in association with one another in a data structure in memory of said central computer system, said customer's TID and an associated HHID;

executing, in said central computer system, HHID code to (1) determine said customer's TID by decrypting said EncTID, (2) determine said associated HHID associated in memory of said central computer system with said customer's TID, and (3) transmit said associated HHID to said POS terminal during said customer's transaction; and transmitting from said POS terminal to a network address, and in association with one another, said UPCs for said customer's purchase transaction, a de-identified version of said TID, DeIdentTID, and said associated HHID.

In dependent aspects the invention provides erasing from memory in said POS terminal without having transmitted from said POS terminal, said customer's TID; wherein said central computer system comprises code for limiting access rights to data in memory of said central computer system storing in association with one another said customer's TID and said associated HHID; wherein said POS terminal comprises memory for storing said customer's TID in addition to said UPCs; wherein said POS terminal comprises memory storing an original transaction data table having fields for storing a first TID, a second TID, a Frequent Shopper identification, FSID, product identification codes, and product prices; wherein said original transaction data table has fields for storing time, POS identification, and retail store computer system identification; wherein said POS terminal comprises memory for storing a De Identified Transaction data table having fields for HHID, de identified first TID, and de identified second TID, a Frequent Shopper identification, FSID, product identification codes, and product prices; wherein said De Identified Transaction data table has fields for storing time, POS identification, and retail store computer system identification; wherein said original transaction data table and said de identified transaction data table have corresponding fields for product Identification codes and quantities, and said POS terminal is designed to populate said corresponding fields with identical data; wherein said POS terminal is designed to store in POS terminal memory in a fields of a record of a de identified transaction data table said associated HHID and a de identified version of said TID; wherein said POS terminal comprises memory for storing TIDs, and wherein said POS terminal further comprises TID erasing code for erasing TIDs from said memory for storing TIDs; wherein said TID erasing code is designed to erase TIDs in said memory for storing TIDs in response to receipt by said POS terminal of at least one of an HHID, an authorization to provide credit, and an end of transaction signal; wherein said network address is an address for an computer designed to associate payloads with HHIDs based upon applying criteria to purchase history data associated with HHIDs; wherein HHID code comprises code for determining if more than one HHID is associated with a TID, and if more than one HHID is associated with a TID, determining which of said more than one HHID to transmit to said POS terminal, if said central computer system subsequently receives said TID from said POS terminal; wherein said central computer system has an HHID data structure in memory that stores in records pairs of one HHID and one TID; wherein said central computer system has a TID data structure in memory that stores in records pairs of TIDs; wherein a TID field in said HHID data structure and TID fields in said TID data structure are link; and wherein code running on said central computer system limits user access to said HHID data structure and said TID data structure to specified user accounts specified in code running on said central computer system.

BRIEF DESCRIPTION OF THE DRAWINGS

The figures provide embodiments of the invention in which like reference numerals refer to the same or corresponding elements.

DETAILED DESCRIPTION

System

Figure 1:
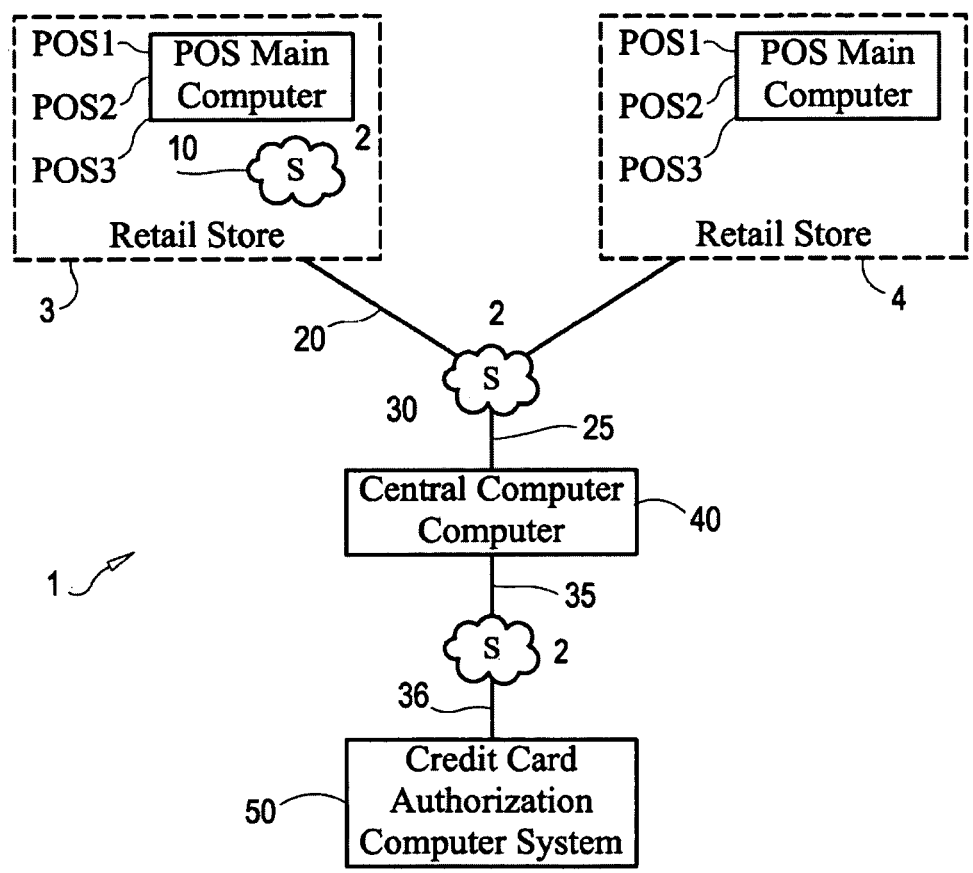
FIG. 1 is a schematic overview of a computer network system 1.

FIG. 1 shows a computer network system 1 including POS computer system 3, POS computer system 4, cental computer system 40, and a credit card authorization computer system 50. Data communication lines 20, 25, 35, and 36 connect the foregoing computer systems to one another via switching networks 2. Each POS computer system includes plural POSs such as POS 1, POS 2, and POS 3. Each POS computer system includes a POS main computer. The POS main computer and the POSs communicate either directly or via switches 2, using data lines.

Herein data lines refer to physical wires or wireless communications.

The configuration of data connections in each retail store may be via direct links of the POSs to the POS main computer, via a loop, or any other topology. Hence, data communication line 10 is shown not connecting in an particular topology to POS main computer and POS 1, POS, and POS 3.

One or more additional computers for marketing execution and marketing analysis may exist, and optionally may reside inside the local area network for each retail store or outside the local area network. Alternatively, the POS main computer of each retail store or the central computer system may perform marketing analysis and execution as described above.

Credit card authentication computer system 50 contains records storing TIDs. It performs the function determining whether to provide or not provide credit for a transaction upon receipt of the TID from central computer system 40.

Each computer system includes one or more computers. Each computer includes at least a central processing unit for processing instructions, memory for storing instructions and data, an input device, and an output device. Each computer system includes an operating system, either programmed or hard coded, enabling the computer to perform data processing functions. Examples of input devices are scanners, key board, and other sensors. Examples of outputs are printers, monitors, and speakers.

Each POS terminal preferably includes a keyboard, a monitor, a printer for printing register receipts, a bar code scanner for scanning product IDs, and a magnetic card reader for reading a TID stored on a credit card. Each POS also includes either shift registers or random access memory and suitable data structures for storing product item identifier, quantity, and price, for a product purchase transaction. Each POS includes code for encrypting a TID.

Each switching network 2 may comprise one or more network switches, or network nodes having network IDs. Networks 2 may represent a single switch or network node, as would be typical inside a retail store's LAN, or a private network of nodes or the public Internet, or combinations of each.

Figure 2:
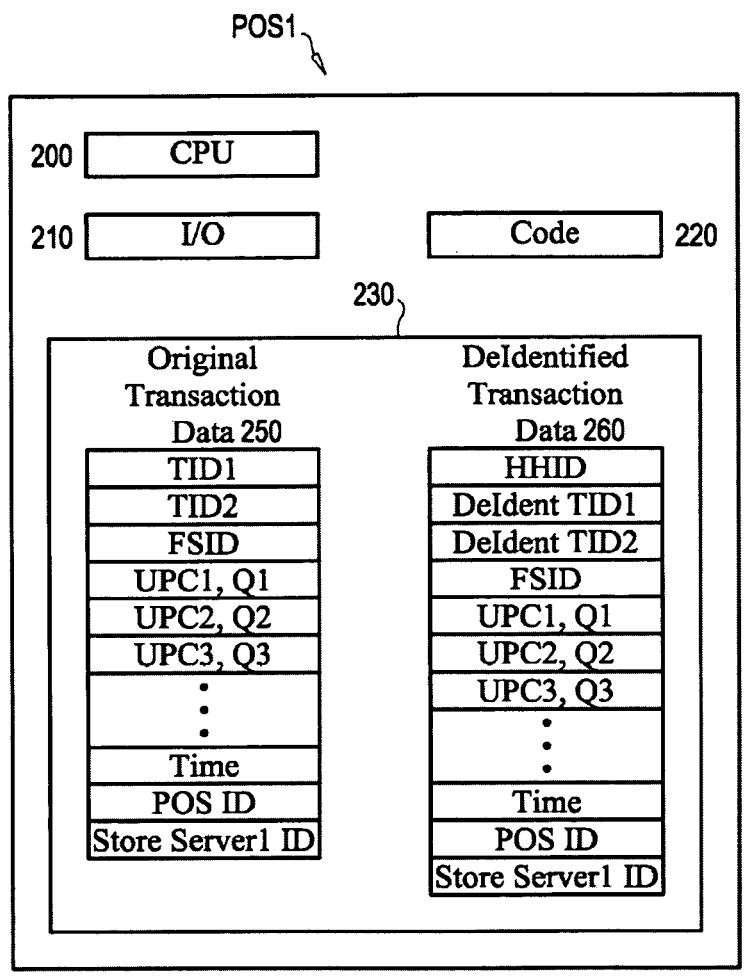
FIG. 2 is a schematic view of POS 1 of FIG. 1

FIG. 2 shows POS 1 including CPU 200, I/O 210, code 220, and additional memory 230. Memory 230 includes original transaction data table 250 and de-identified transaction data table 260. Additional memory 230 is in addition to memory storing code 210. Tables 250 and 260 are shown in design view in which each row represents a different field of the same record. Each record represents associated data elements.

Original transaction data table 250 has fields for storing in each record TID 1, TID 2, FSID, a number of product identifier codes, UPC1, 2, 3, . . . each associated with a quantity of product items, Q1, Q2, Q3, . . . , and optionally other fields such as current time, POS identification, and POS main computer identification. Fields TID 1 and TID 2 enable the POS to store more than one tender identification for a transaction. This is particularly useful when the customer attempting to purchase has TID 1 refused, that is, credit card authorization computer system 50 refuses to provide credit when TID 1 is presented to it during the transaction, and that refusal is forwarded back to the POS during the transaction.

De-identified transaction data table 260 is similar to table 250 except that the TIDs have been replaced by de-identified versions thereof. De-identified transaction data table 260 includes fields for storing in each record DeIdentTID 1, DeIdentTID 2, FSID, an number of product identifier codes, UPC1, 2, 3, . . . each associated with a quantity of product items, Q1, Q2, Q3, . . . , and optionally other fields such as current time, POS identification, Store server identification.

In other alternatives, additional memory 230 may include a single table having the form of table 260 in which TIDs are originally stored in fields DeIdentTID 1 and DeIdentTID 2, and then those values are replaced before the record is transmitted to an address for storage, by de-identified versions of the TIDs. Of course, other data structures for storing purchase transaction data in which TIDs are replaced by de-identified versions thereof and an HHID is added are obvious and functional for the goal of removing the ability to recall from memory actual TIDs subsequent to completion of a transaction in which the TID is used for purchasing.

In one alternative, additional memory 230 stores a transaction ID generated by the POS terminal and stores that in a field in table 250 and 260 or only in table 260.

Preferably, the TIDs in original transaction data table 250 never leave the POS and are erased some time after they are no longer needed to complete a purchase transaction. Preferably, the POS terminal runs code to erase data in table 250 either in response to receipt of an HHID, receipt of authorization to provide credit, or an end of transaction signal. Less preferably, the POS terminal runs code to erase data in table 250 periodically, such as nightly, or aperiodically, such as upon receipt of an external command.

In one alternative, each POS includes code for encrypting a TID upon receipt of the TID. In one alternative, each POS includes code for encrypting and forwarding to a central computer system an encrypted TID upon receipt of a TID without storing the TID, or without storing the TID or the encrypted TID thereafter.

In a preferred embodiment, a de-identified TID is generated from a TID by replacing the ASCII characters of the TID with zeros, or some other arbitrary character for all but the first digit and the last four digits. For example, a 16 digit TID of 1234567890123456 would be de identified by replacing it with a DeIdent TID of 1234560000003456. The POS terminal employs hard programmed circuits or code to effect de identification.

Figure 3:
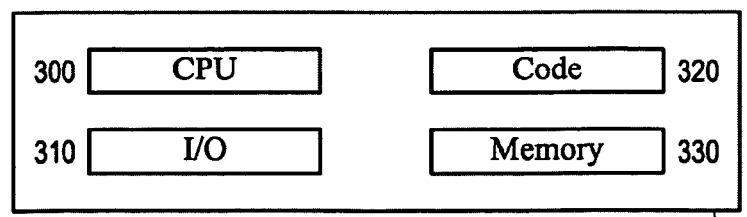
FIG. 3 is a schematic view of a POS main computer of FIG. 1.

FIG. 3 shows a POS main computer of FIG. 1 including CPU 300, I/O 310, code 320, and additional memory 330. FIG. 3 also shows network line 10' extending from the POS main computer.

Figure 4:
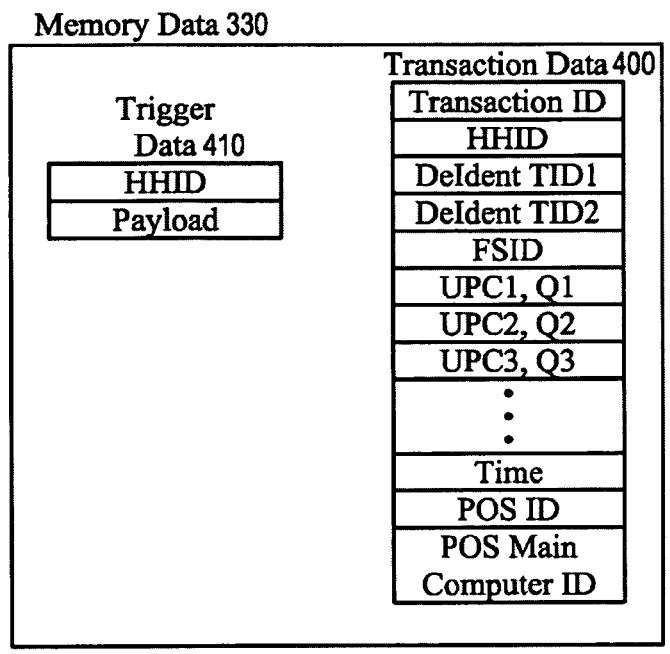
FIG. 4 is schematic view of memory 330 of FIG. 3.

FIG. 4 shows additional memory 330 including transaction data table 400 and trigger data table 410 in design view.

Transaction data table 400 includes fields for storing in each record the fields in table 260 and optionally a transaction ID. Thus, table 400 includes fields for storing in each record transaction ID, HHID, DeIdentTID 1, DeIdentTID 2, FSID, a number of product identifier codes, UPC1, 2, 3, . . . each associated with a quantity of product items, Q1, Q2, Q3, . . . , and optionally other fields such as current time, POS identification, and POS main computer identification.

Trigger data table 410 includes fields for storing in each record an HHID and one or more payloads.

Figure 5:
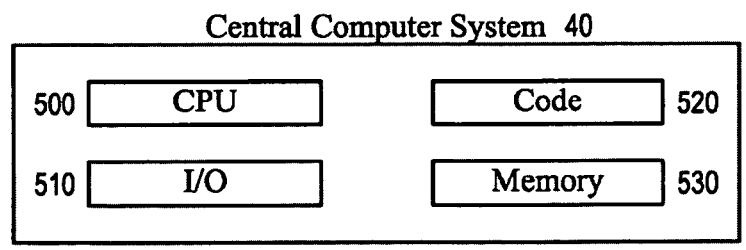
FIG. 5 is a schematic view of Central Server System 40 of FIG. 1.

FIG. 5 shows central computer system 40 including CPU 500, I/O 510, code 520, and additional memory 530.

Figure 6:
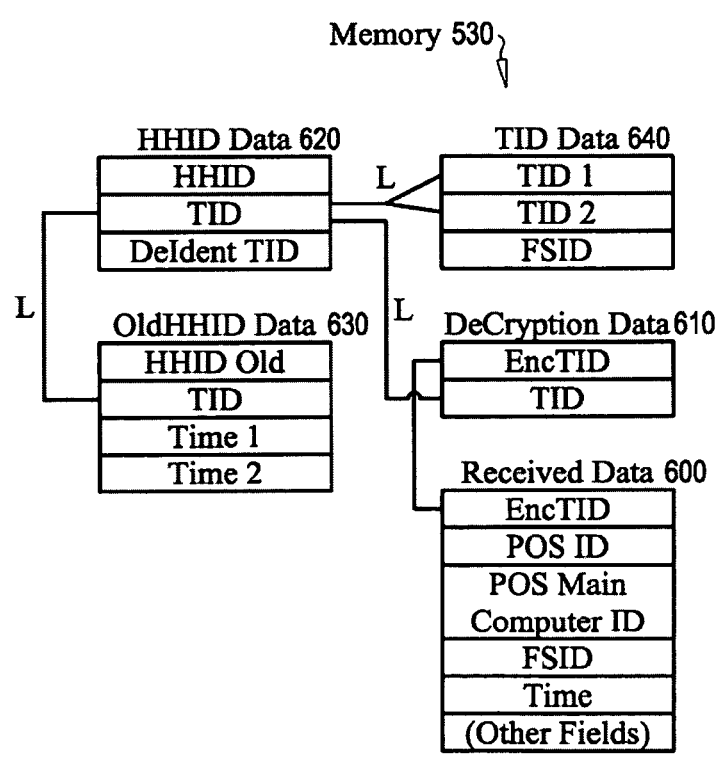
FIG. 6 is a schematic view of memory 530 of FIG. 4.

FIG. 6 shows additional memory 530 including data structures or tables: Received data table 600; Decryption data table 610; HHID data table 620; Old HHID data table 630; TID data table 640, and Links, L. The applicant emphases that these data structures are only exemplary of data structures controlled by central computer system 40 that can accomplish the purpose of maintaining a unique HHID for any TID, and transmitting that unique HHID to the POS upon receipt from the POS of an encrypted TID so that the POS may transmit to some address for storage, elements for a record including the HHID instead of the TID.

Links L represent logical associations of fields in different tables. Links L may be one to one, one to many, or many to many relationships. For example the link between tables 600 and 610 is shown as a one to one relationship, one field linked in each table. The link between tables 620 and 640 is a one to many relationship, showing that the field TID in table 620 is associated with both fields TID 1 and TID 2 in table 640.

Of particular relevance, software installed on central computer system 40, such as operating system software or database management software, limits access rights to memory 530, that is, the memory storing associations of the HHIDs with TIDs, to certain users. For example, read access may be limited to system administrators. As a result, other users that are authorized to use data mining software to determine payloads to associate with purchase history data associated with an HHID in table 400, are not able to access TIDs in memory 530. As a result, such other users do not have access to financial account identifiers of consumers having purchase history records in table 400. More specifically, at least one user account that has rights to access data in table 400 does not have rights to access data in memory 530.

Received data table 600 includes fields for storing in each record EncTID, POS ID, POS main computer ID, FSID, time, and additional fields for other data relating to the transaction, notes as "(other fields)". The other fields may include any of the transaction data elements received at the POS. In operation discussed below, the POS generates an EncTID by encrypting the TID it receives during a transaction.

Decryption data table 610 includes fields for storing EncTID and TID. Preferably, central computer system 40's code 520 stores a decryption algorithm for decrypting the type of encryption used to Encrypt TID to make the EncTID.

HHID data table 620 includes fields for storing HHID, TID, and DeIdentTID.

Old HHID data table 630 includes fields for storing HHID Old, TID, Time 1, and Time 2.

TID data table 640 includes fields for storing TID 1, TID 2, and FSID.

Methods of Use

Figure 7:
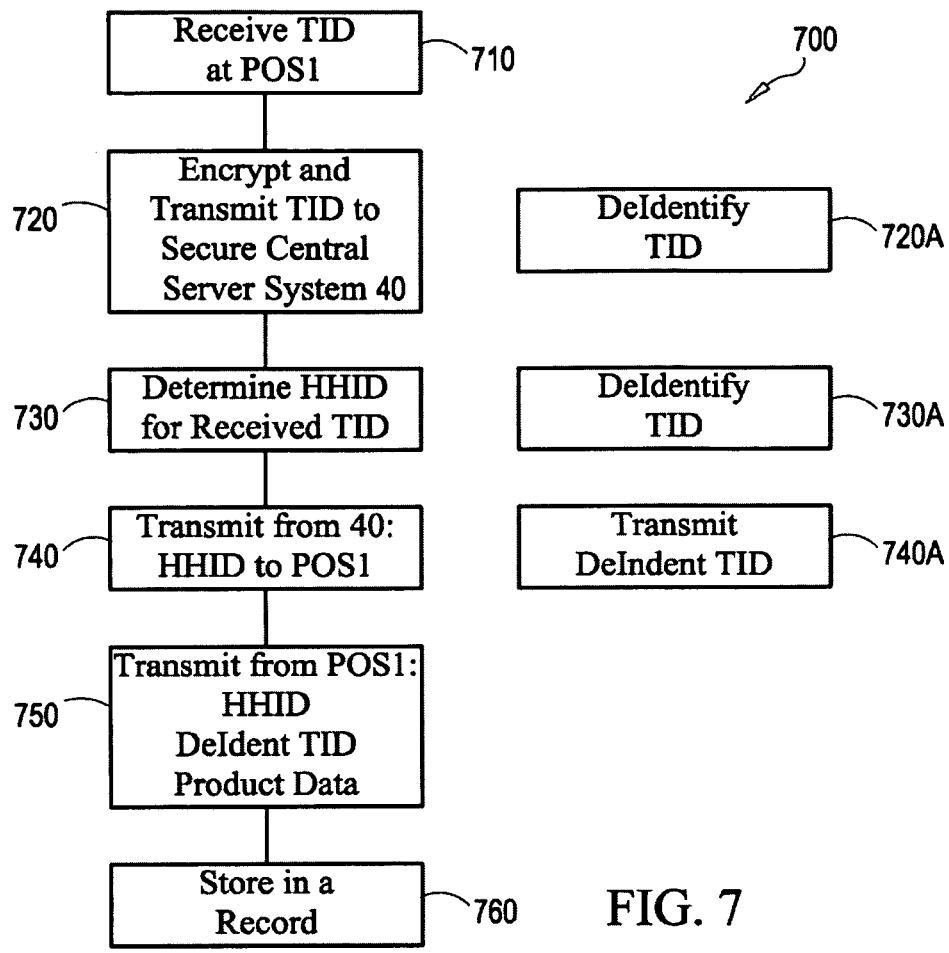
FIG. 7 is a flow chart showing an overview of a novel process using system 1 of FIG. 1.

FIG. 7 shows flow chart 700 showing an overview of a novel process using system 1 of FIG. 1.

In step 710, POS 1 receives a TID. That is, a TID is scanned in, read, or entered via a keyboard during a customer's transaction at the POS.

In step 720, POS 1 encrypts and transmits the encrypted TID to central server system 40. That is, POS 1 runs an encryption algorithm stored at POS 1 to generate EncTID, preferably along with other information identifying POS 1 and or the transaction. POS 1 transmits EncTID via some network protocol. The path the data defining EncTID takes may pass through the POS main computer, or not, and private and/or public network nodes, before reaching central computer system 40.

In optional step 720A, POS 1 runs code to do-identify the TID to generate DeIdentTID. This is optional because optionally central computer system 40 may execute optional steps 730A and 740A to generate DeIdentTID and transmit DeIdentTID along with HHID back to POS 1.

In step 730, central computer system 40 determines an HHID corresponding to the TID it received from POS 1 in step 720. Code 520 in central computer system 40 does this by storing EncTID in Received data table 600, running a decryption algorithm on the value of EncTID to generate TID or retrieving TID from a record in Decryption data table 610. Code 520 then queries table 620 with the TID to identify the HHID for the record containing the TID. If no such record exists, code 520 may query TID data table 640 to determine if there is a TID in field TID 2 associated with TID in field TID 1 for the TID. If so, code 520 can then query HHID data table 620 with the TID value in field TID 2 to retrieve an HHID.

If central computer system 40 receives two TIDs associated with the same transaction, code 520 may store the two TIDs in a record in TID data table 640 in fields TID 1 and TID 2 if it determines that no such record currently exists. If such a record is created, code 520 may also query HHID data table 620 to determine if there are different HHIDs associated with the two received TIDs. If so, code 520 may generate a new record in Old HHID data table 630 storing one of the two HHIDs and removing from HHID data table 620 the record containing the other HHID. This maintains a more or less unique HHID in table 620 for any set of TIDs associated with one another in records in TID data table 640. Code 520 may also generate DeIdentTID.

Alternatively, HHID data table 620' may include the same fields as HHID data table 620 and also a status field. The status field of each record may be used to specify if the HHID of that record is retired or active. A status field of retired indicates that the HHID in that record has been replaced with another HHID which exists in some other record in table 620'. Table 620' may be used for the same purpose as tables 620 an 630, which is to maintain a unique active HHID associated with one or more TIDs.

In step 740, code 520 transmits from central computer system 40 the determined HHID back to POS 1. It may of course transmit additional data in association with the HHID, such as the EncTID, POS ID, DeIdentTID, time, approval or denial of credit, and other data. Data defining approval or denial of credit is discussed in connection with FIG. 8.

Alternatively, central computer system 40 also executes optional steps 730A and 740A as noted above.

In step 750, POS 1 transmits to a specified address, HHID, DeIdentTID, and product data identifying the products, quantities, prices, and other data relating to the customer's purchase transaction.

In step 760, a computer at the address to which data is stored in step 750 stores the received data in a record in a purchase history database. Note that data in this purchase history database is incapable of being used to identify the TID, but it can be used to determine targeted marketing payloads to associate with an HHID.

Figure 8:
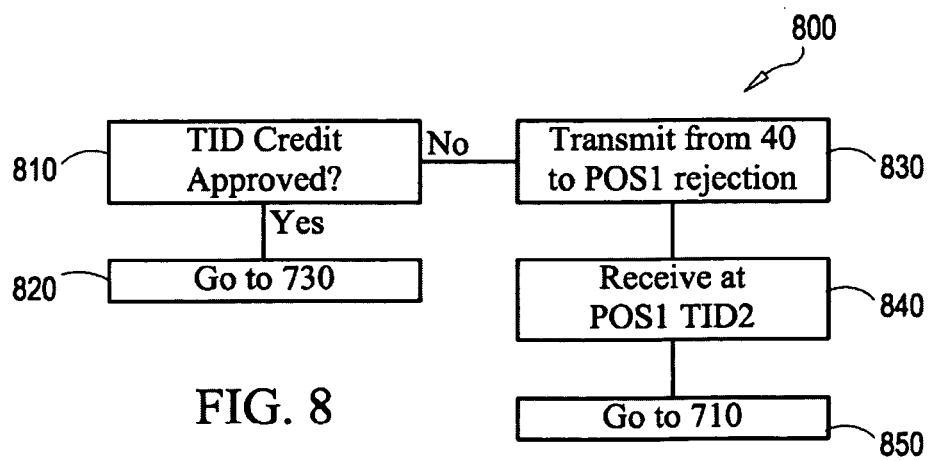
FIG. 8 is a flow chart showing additional steps involved in approving and dis-approving credit for a transaction involving a TID.

FIG. 8 shows flow chart 800 including steps relating to credit determinations.

Code 520 in central computer system 40 transmits a TID to credit card authorization computer system 50.

In step 810, central computer system 40 receives a response from credit card authorization computer system 50.

In step 820, credit for the TID is approved and processing continues at step 730.

In step 830, credit for the TID is denied, and code 520 transmits to POS 1 a communication indicating credit is denied.

In step 840, POS 1 receives TID 2. That is, the POS responds to the receipt of denial of credit for a first TID, TID 1, by prompting the customer for another TID. Upon receipt, that TID is stored as TID 2, and POS 1 re-sends data to central computer system 40 using TID 2.

In step 850, processing proceeds from step 710 for newly received TID 2.

Figure 9:
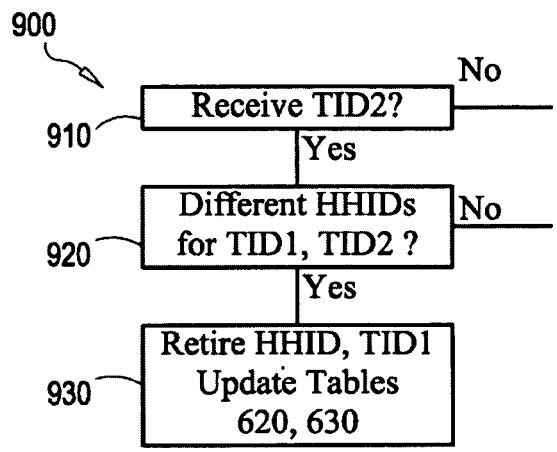
FIG. 9 is a flow chart showing steps involved central computer system 40 of FIG. 1 in managing HHIDs.

FIG. 9 shows flow chart 900 summarily explaining how code 520 in central computer system 40 responds to receipt of two TIDs for the same transaction.

In step 910, code 520 in central computer system 40 determines if two TIDs have been received. If not, processing proceeds as generally described in connection with FIG. 7.

In step 920, code 520 determines that two TIDs have been received for the same transaction and checks to determine if different HHIDs exist for the two TIDs. If not, processing proceeds as generally described in connection with FIG. 7.

In step 930, code 520 determines that two different HHIDs exist for the two TIDs received for the same transaction, and proceeds to step 930.

In step 930, code 520 retires one of the HHIDs, such as the HHID for TID 1, and updates HHID data table 620 and Old HAD data table 630 accordingly.

Figure 10:
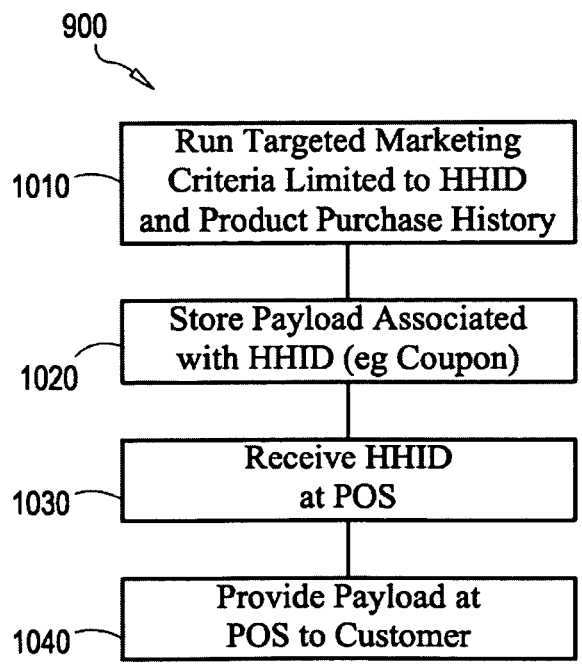
FIG. 10 is a flow chart showing execution of targeted marketing using the system of FIG. 1.

FIG. 10 shows flow chart 1000 showing a high level view of steps involved in use of the database storing the HHIDs in association with purchase transaction data.

In step 1010, code (on any one of the computers identified herein) runs algorithms applying targeted marketing criteria to purchase history data. More specifically, each run criteria limit to purchase history data associated with a single HHID, and includes additional limitations relating to any of the other fields. For example, multiple purchases of a certain product in different purchase transactions associated with the same HHID may meet a targeted marketing criteria.

In step 1020, payloads associated with targeted marketing criteria that are met by each HHID are stored in association with that HHID in a trigger table, such as Trigger data table 410 in memory 330 of a POS main computer, or in a Trigger table stored in central computer system 40 or a marketing execution computer. That is code runs on a computer to determine a payload to associate with an HHID if that HHID meets the targeted marketing criteria.

In step 1030, an HHID is received at a POS of a retail store. Code queries the trigger table for a payload associated with that HHID, and transmit any such associated payload to the POS. There may be more than one payload.

In step 1040, the POS or some other computer system presents the payload at the POS in a manner designed to obtain the attention of the customer involved in the purchase transaction, such by printing, electronic display, audio announcement, or transmission of data to a cellular telephone or network addressable device associated with the HHID.

Web Based Transactions

The concepts discussed above are applicable to web based purchases. In a web based purchase model a client PC enters into a virtual session with a server using network protocol such as http and/or https. Via transmission of web pages to the client PC and transmission of selection data and TID data from the client PC to the server, the customer operating the client PC selects and pays for purchases. The server receiving the selection data stores that data in association with identification of the customer received during the virtual session, such as a client log on ID, name, etc. The server also receives a TID. In operation of storing data relating to the transaction, the server receive and store the TID in association with an HHID securely as discussed above, and store in the transaction data in association with the HHID. As a result the transaction data and HHID are available for marketing whereas the TID to HHID relationship is maintained unavailable to marketing.

SUMMARY

The foregoing provides embodiments implementing the goal of maintaining purchase history databases useful for targeted marketing while preventing users from obtaining access to customer financial accounts. These embodiments are illustrative of the concept, and the broader scope of the invention is defined by the claims.

The invention claimed is:

1. A method for identifying a household based on a tender identification, the method being implemented by a central computer having one or more physical processors programmed by computer program instructions that, when executed by the one or more physical processors, cause the central computer to perform the method, the method comprising:
   receiving, by the central computer, from a retail location, an encrypted tender identification that when decrypted identifies a payment account to be debited in relation to a purchase transaction at the retail location;
   identifying, by the central computer, a household identifier based on the encrypted tender identification, wherein the household identifier identifies a household or a member of the household that is associated with the identified payment account, and wherein the household identifier is associated with historical purchase transaction data that is associated with members of the household;
   causing, by the central computer, the household identifier to be communicated to the retail location,
   wherein, when a pre-existing household identifier does not exist for the identified payment account associated with the household or the member of the household, then generating by the central computer the household identifier,
   wherein the household identifier is unique to the household or the member of the household that is associated with the identified payment account, is stored in a data structure comprising the household identifier, and is configured for linking to multiple payment account identifiers that are associated with the members of the household; and
   communicating, based on a determination that a promotion is associated with the household identifier, the promotion to a device associated with another one of the members of the household other than the member of the household.

2. The method of claim 1, wherein receiving the encrypted tender identification comprises receiving the encrypted tender identification from a point of sale computer of the retail location.

3. The method of claim 2, the method further comprising:
   identifying, by the central computer, the promotion; and
   communicating, by the central computer, the promotion to the point of sale computer.

4. The method of claim 1, wherein identifying the household identifier based on the encrypted tender identification comprises:
   decrypting, by the central computer, the encrypted tender identification;
   determining, by the central computer, the tender identification based on the decrypting; and
   obtaining, by the central computer, a stored association between the tender identification and the household identifier.

5. The method of claim 1, wherein identifying the household identifier based on the encrypted tender identification comprises:
   obtaining, by the central computer, a stored association between the encrypted tender identification and the household identifier.

6. The method of claim 1, further comprising:
   receiving, by the central computer, from the retail location, purchase transaction information;
   identifying, by the central computer, the promotion based on the purchase transaction information; and
   causing, by the central computer, the promotion to be communicated.

7. The method of claim 6, wherein the purchase transaction information comprises an identification of a product being purchased.

8. The method of claim 1, further comprising:
   obtaining, by the central computer, a prior purchase transaction associated with the household identifier;
   identifying, by the central computer, the promotion based on the prior purchase transaction; and
   causing, by the central computer, the promotion to be communicated.

9. The method of claim 8, wherein the prior purchase transaction comprises an identification of a product that was purchased.

10. The method of claim 1, further comprising:
    receiving, by the central computer, purchase transaction information;
    obtaining, by the central computer, a prior purchase transaction associated with the household identifier;
    identifying, by the central computer, the promotion based on the purchase transaction and the purchase transaction information; and
    causing, by the central computer, the promotion to be communicated.

11. The method of claim 1, the method further comprising:
    identifying, by the central computer, a promotion based on the household identifier; and
    causing, by the central computer, the promotion to be communicated.

12. The method of claim 11, further comprising:
    associating, by the central computer, a payload comprising the promotion with the household identifier; and
    causing, by the central computer, the association to be stored in a database, wherein identifying the promotion based on the household identifier comprises:
    querying the database to determine the payload associated with the household identifier.

13. The method of claim 1, further comprising:
    receiving, by the central computer, a frequent shopper identification; and associating, by the central computer, the frequent shopper identification with the tender identification or the household identifier.

14. The method of claim 11, wherein the promotion comprises a coupon.

15. A method for providing promotions to a household, the method being implemented by a point of sale computer having one or more processing units programmed by computer program instructions that, when executed by one or more physical processors, cause the point of sale computer to perform the method, the method comprising:
  receiving, by the point of sale computer, a tender identification that identifies a payment account;
  encrypting, by the point of sale computer, the tender identification;
  communicating, by the point of sale computer, the encrypted tender identification to a central computer;
  receiving, by the point of sale computer, a household identifier from the central computer that determined the household identifier based on the identified payment account, wherein the household identifier identifies a household or a member of the household that is associated with the identified payment account, and wherein the household identifier is associated with historical purchase transaction data that is associated with members of the household;
  obtaining, by the point of sale computer, a promotion based on the household identifier,
  wherein the household identifier is generated when a pre-existing household identifier does not exist for the identified payment account, and
  wherein the household identifier is unique to the household or the member of the household that is associated with the identified payment account, is stored in a data structure comprising the household identifier, and is configured for linking to multiple payment account identifiers that are associated with the members of the household; and
  communicating, by the point of sale computer, a record to the central computer, wherein the record comprises the promotion, which is configured for subsequent communication by the central computer to a device associated with another one of the members of the household other than the member of the household.

16. The method of claim 15, further comprising:
  communicating, by the point of sale computer, the promotion.

17. The method of claim 16, wherein communicating the promotion comprises:
  printing, by the point of sale computer, the promotion on a purchase transaction receipt.

18. The method of claim 16, wherein communicating the promotion comprises:
  causing, by the point of sale computer, the promotion to be communicated via email, telephone, postal mail, social networks, real simple syndication feeds, or fuel station terminals.

19. The method of claim 16, wherein communicating the promotion comprises:
  causing, by the point of sale computer, the promotion wirelessly direct to a mobile device within proximity of the point of sale computer.

20. The method of claim 15, further comprising:
  associating, by the point of sale computer, a payload comprising the promotion with the household identifier; and
  causing, by the point of sale computer, the association to be stored in a database, wherein obtaining the promotion based on the household identifier comprises:
    querying, by the point of sale computer, the database to determine the payload associated with the household identifier.

21. The method of claim 15, further comprising:
  communicating, by the point of sale computer, the household identifier to a computer remote from the point of sale computer,
  wherein obtaining the promotion comprises:
    receiving, by the point of sale computer, the promotion from the computer remote from the point of sale computer.

22. The method of claim 20, wherein associating the payload comprising the promotion with the household identifier is based on purchase transaction information comprising an identification of a product being purchased.

23. The method of claim 20, wherein associating the payload comprising the promotion with the household identifier is based on purchase transaction information comprising an identification of a product that was previously purchased in association with the household identifier.

24. The method of claim 15, further comprising:
  receiving, by the point of sale computer, a frequent shopper identification; and
  associating, by the point of sale computer, the frequent shopper identification with the tender identification or the household identifier.

25. The method of claim 15, wherein receiving the tender identification, encrypting the tender identification, communicating the encrypted tender identification and receiving the household identifier occur during a single purchase transaction.

26. The method of claim 25, wherein obtaining the promotion occurs during or following the single purchase transaction.

27. The method of claim 15, further comprising:
  communicating, by the point of sale computer, the household identifier to a computer remote from the point of sale computer;
  wherein obtaining the promotion comprises receiving, by the point of sale computer, the promotion from the remote computer that determined the promotion based on the household identifier.

28. The method of claim 27,
  further comprising one of (i) receiving, by the point of sale computer, a de-identified version of the tender identification from the central computer, or (ii) generating, by the point of sale computer, the de-identified version of the tender identification based on the received tender identification;
  wherein obtaining the promotion comprises obtaining, by the point of sale computer, the promotion from the remote computer that determined the promotion based further on the de-identified version of the tender identification.

29. The method of claim 28,
  further comprising receiving, by the point of sale computer, purchase transaction information comprising an identification of a product being purchased;
  wherein obtaining the promotion comprises obtaining, by the point of sale computer, the promotion from the remote computer that determined the promotion based further on the purchase transaction information.

30. The method of claim 27, wherein obtaining the promotion comprises obtaining, by the point of sale computer, the promotion from the remote computer that determined the promotion based further on a purchase history associated with the household identifier.

31. The method of claim 15,
wherein receiving the tender identification, encrypting the tender identification, communicating the encrypted tender identification and receiving the household identifier occur during a single purchase transaction, and
wherein the method further comprises:
storing, by the point of sale computer in a memory, the received tender identification; and
erasing, by the point of sale computer, the stored tender identification from the memory in response to one of receiving the household identifier from the central computer, an end of the purchase transaction and receiving an authorization to receive credit associated with the tender identification for a product being purchased in the purchase transaction.

32. A point of sale system, comprising:
a reader for reading tender identifications;
a processing unit; and
a memory having stored therein instructions which, when executed by the processing unit, cause the processing unit to:
receive from the reader a tender identification that identifies a payment account, to encrypt the received tender identification;
communicate the encrypted tender identification to a central computer that determines a household identifier based on the identified payment account, wherein the household identifier identifies a household or a member of the household that is associated with the identified payment account, and wherein the household identifier is associated with historical purchase transaction data that is associated with members of the household;
receive the determined household identifier from the central computer;
obtain a promotion based on the received household identifier,
wherein the household identifier is generated when a pre-existing household identifier does not exist for the identified payment account, and
wherein the household identifier is unique to the household or the member of the household that is associated with the identified payment account, is stored in a data structure comprising the household identifier, and is configured for linking to multiple payment account identifiers that are associated with the members of the household; and
communicate a record to the central computer, wherein the record comprises the promotion, which is configured for subsequent communication by the central computer to a device associated with another one of the members of the household other than the member of the household.

33. The point of sale system of claim 32,
further comprising a printer,
wherein the instructions stored in the memory further include instructions which, when executed by the processing unit, cause the processing unit to control the printer to print the promotion.

34. The point of sale system of claim 32, wherein the instructions stored in the memory further include instructions which, when executed by the processing unit, cause the processing unit to communicate the household identification to a computer remote from the point of sale system, and to obtain the promotion from the remote computer that determined the promotion based on the household identifier.

35. The point of sale system of claim 34, wherein the instructions stored in the memory further include instructions which, when executed by the processing unit, cause the processing unit to perform one of: (i) receive from the central computer a de-identified version of the tender identification or (ii) generate the de-identified version of the tender identification from the tender identification received from the reader, to communicate the de-identified version of the tender identification to the remote computer, and to obtain the promotion from the remote computer that determined the promotion based further on the de-identified version of the tender identification.

36. The point of sale system of claim 35,
further comprising a scanner for scanning an identification of a product being purchased as part of a purchase transaction;
wherein the instructions stored in the memory further include instructions which, when executed by the processing unit, cause the processing unit to communicate the identification of the product to the remote computer, and to obtain the promotion from the remote computer that determined the promotion based further on the identification of the product.

37. The method of claim 11, the method further comprising:
causing, by the central computer, the promotion to be communicated to a remote computer separate from a point of sale computer, wherein the remote computer and the point of sale computer are associated with the retail location.

38. A system for providing promotions to a household, the system comprising:
a central computer comprising one or more physical processors programmed by computer program instructions that, when executed by the one or more physical processors, cause the central computer to:
receive, from a retail location, an encrypted tender identification that when decrypted identifies a payment account to be debited in relation to a purchase transaction at the retail location;
identify a household identifier based on the encrypted tender identification, wherein the household identifier identifies a household or a member of the household that is associated with the identified payment account, and wherein the household identifier is associated with historical purchase transaction data that is associated with members of the household;
cause the promotion to be communicated to the retail location,
wherein, when a pre-existing household identifier does not exist for the identified payment account associated with the household or the member of the household, then generating the household identifier, and
wherein the household identifier is unique to the household or the member of the household that is associated with the identified payment account, is stored in a data structure comprising the household identifier, and is configured for linking to multiple payment account identifiers that are associated with the members of the household; and
communicate, based on a determination that the promotion is associated with the household identifier, the promotion to a device associated with another one of the members of the household other than the member of the household.

39. The system of claim 38, wherein the encrypted tender identification is received from a point of sale computer of the retail location, and wherein central computer is further programmed to communicate the household identifier to the point of sale computer.

40. The system of claim 38, wherein the central computer is further programmed to:
    identify a promotion based on the household identifier; and
    communicate the promotion and the household identifier to a remote computer separate from a point of sale computer, wherein the remote computer and the point of sale computer are associated with the retail location.

41. The system of claim 38, wherein to identify the household identifier based on the encrypted tender identification, the central computer is further programmed to:
    obtain an association between the encrypted tender identification and the household identifier.

42. The method of claim 11, wherein causing the promotion to be communicated comprises:
    causing, by the central computer, the promotion to be communicated via email, telephone, postal mail, social networks, real simple syndication feeds, or fuel station terminals.

43. The method of claim 15, the method further comprising:
    receiving, by the point of sale computer, item identification information that identifies an item being purchased during a transaction; and
    causing, by the point of sale computer, the item identification information to be stored in association with the household identifier, wherein the association of the item identification information with the household identifier is used to target a promotion for a consumer that presents the tender identification for payment of the transaction without storing the tender identification.

44. The method of claim 15, wherein the promotion is targeted for a consumer based on a presentation of the tender identification for payment of a transaction, without storing the tender identification.

* * * * *